United States Patent [19]

Schneider

[11] Patent Number: 5,777,904
[45] Date of Patent: Jul. 7, 1998

[54] SYSTEM COMPRISING AN APPARATUS AND A PERIPHERAL DEVICE FOR THE APPARATUS, AND AN APPARATUS AND A PERIPHERAL DEVICE FOR SUCH A SYSTEM

[75] Inventor: Gerhard Schneider, Vienna, Austria

[73] Assignee: U.S. Philips Corporation, New York, N.Y.

[21] Appl. No.: 606,120

[22] Filed: Feb. 23, 1996

[30] Foreign Application Priority Data

Feb. 23, 1995 [AT] Austria ........................ 329/95

[51] Int. Cl.$^6$ ........................................... G06F 3/03
[52] U.S. Cl. ............... 364/709.11; 324/677; 324/678; 364/400; 364/480; 364/481; 364/709.09
[58] Field of Search ................. 324/607, 677, 324/678, 711, 712; 345/156, 161; 364/400, 480, 481, 482, 709.01, 709.09, 709.11; 463/38

[56] References Cited

U.S. PATENT DOCUMENTS

| 3,214,514 | 10/1965 | Schmid | 345/161 X |
| 4,868,549 | 9/1989 | Affininto et al. | 340/710 |
| 5,600,254 | 2/1997 | Berberich | 324/711 |
| 5,632,680 | 5/1997 | Chung | 463/38 X |

Primary Examiner—Edward R. Cosimano
Attorney, Agent, or Firm—Robert M. McDermott

[57] ABSTRACT

In a system which comprises an apparatus, having a connection device with connection contacts, and at least one peripheral device which can be connected to the apparatus and comprises a counter-connection device which can be detachably connected to the connection device and comprises counter-contacts, at least one counter-contact being connected to a resistor provided in the peripheral device, the apparatus comprising a circuit arrangement for determining the value of a resistor, the circuit arrangement is additionally arranged to generate at least one control information item for the peripheral device which comprises an evaluation device for evaluating the control information.

20 Claims, 5 Drawing Sheets

SYSTEM COMPRISING AN APPARATUS AND A PERIPHERAL DEVICE FOR THE APPARATUS, AND AN APPARATUS AND A PERIPHERAL DEVICE FOR SUCH A SYSTEM

BACKGROUND OF THE INVENTION

The invention relates to a system which comprises an apparatus, having a connection device with connection contacts, and at least one peripheral device for the apparatus, which peripheral device can be connected to the apparatus and comprises a counter-connection device which can be detachably connected to the connection device and comprises counter-contacts, at least one counter-contact being connected to at least one resistor provided in the peripheral device, the connection contact of the connection device which can be detachably connected to said counter-contact being connected to a circuit arrangement which is provided in the apparatus in order to determine the value of a resistor provided in a peripheral device.

The invention also relates to an apparatus for a system of the kind set forth, which apparatus comprises at least one circuit arrangement for determining the value of a resistor and a connection device having connection contacts, a counter-connection device which comprises counter-contacts and forms part, of a peripheral device which can be connected to the apparatus being detachably connectable to the connection device, at least one counter-contact of said counter-connection device being connected to at least one resistor provided in the peripheral device, the connection contact of the connection device which can be detachably connected to said counter-contact being connected to the circuit arrangement.

The invention also relates to a peripheral device for a system of the kind set forth, which peripheral device comprises a counter-connection device which can be detachably connected to the connection device of an apparatus comprising a circuit arrangement for determining the value of a resistor, at least one counter-contact of said counter- connection device being connected to a resistor.

A system of the kind set forth in the first paragraph, an apparatus of the kind set forth in the second paragraph, and a peripheral device of the kind set forth in the third paragraph are known per se, that is to say in the form of a commercially available personal computer which constitutes the apparatus of the system and which comprises a connection device in the form of a so-called game port whereto a multi-pole connector, acting as the counter-connection device, of a so-called joystick device which acts as the peripheral device of the system can be detachably connected. A joystick device of this kind includes two variable resistors which can be varied by means of a joystick and whereby control information, corresponding to their instantaneous resistance value, can be generated in order to control the displacement of an object on the display screen of the known personal computer. For the detection of the instantaneous resistance of each of the two variable resistors of the joystick device, adjusted by means of the joystick device, a circuit arrangement provided in the personal computer and arranged to determine the value of a resistance is connected to each resistor of the joystick device, via a counter-contact of the multi-pole connector and a connection contact of the game port. Each of the two circuit arrangements for determining the value of a resistance comprises a capacitor and a control device which is arranged to generate and output successive control pulses, a switching device which is

2 connected to the capacitor and which can be controlled, in dependence on the control pulses of the control device, to a given switching state in which a charging current which is dependent on the value of a resistance to be measured can flow, and a detector device which is connected to the capacitor and is capable of detecting the time interval between the instant at which the flowing of a charging current commences and the instant of occurrence of a given amplitude value of the charging current, or the corresponding charging voltage, it being possible to derive the value of a resistance from said time interval. In the known system, or in the known personal computer of this system, the two described circuit arrangements are only capable of determining the value of a respective variable resistor provided in a joystick device which can be connected to the personal computer. This represents a restriction which is a drawback for many applications of such a system.

It is an object of the invention to eliminate the described restriction and to construct a system of the kind set forth in the first paragraph, an apparatus of the kind set forth in the second paragraph, and a peripheral device of the kind set forth in the third paragraph in an as simple, inexpensive and reliable manner as possible so that a circuit arrangement which is included in the apparatus of the system in order to determine the value of a resistance provided in a peripheral device connected to the apparatus is suitable not only for determining a resistance value, but also for controlling a device provided in the peripheral device.

In order to achieve this object, a system in accordance with the invention is characterize in that at least one circuit arrangement is additionally arranged to generate at least one control information item for the peripheral device and that the peripheral device comprises an evaluation device for evaluating the control information item. It is thus achieved, in a particularly simple and inexpensive manner and utilizing a circuit arrangement which is present any way, that the circuit arrangement, while maintaining its function for determining the value of a resistance present in a peripheral device, can additionally generate at least one control information item for a peripheral device, which control information item can be evaluated in the relevant peripheral device so as to control a device provided in the peripheral device. For example, in the case of a system in accordance with the invention which consists of a personal computer and a joystick device, it is thus possible to generate, during the playing of a computer game, in which an object is moved across a display screen of the personal computer by means of the joystick device so as to reach given positions, a control information item in the personal computer when such a desired position is reached, which control information item is applied to the joystick device in which it activates a device, for example an acoustic device, so as to signal acoustically that the desired position had been reached.

A control information item which can be generated by means of a circuit arrangement of the apparatus of a system in accordance with the invention can be derived from a counter-contact which is connected to a variable resistor whose value can be determined by means of the circuit arrangement and which forms part of the counter-connection device of a peripheral apparatus, different control information items then being obtained as a function of amplitude in conformity with the adjusted resistance of the variable resistor. It has been found that in a system in accordance with the invention it is particularly attractive if the control information which can be generated by means of the circuit arrangement of the apparatus can be derived from a counter-contact which is connected to a resistor of fixed value and forms part of the counter-connector device of the peripheral device, and if the evaluation device of the peripheral device is connected to said counter-contact. It is thus achieved that control information which always remains the same in respect of amplitude can be derived.

A preferred embodiment of a system in accordance with the invention is characterized in that the circuit arrangement is provided in a personal computer which constitutes the apparatus of the system and is constructed as a dictation storage device. It has been found that the steps of the invention can be particularly advantageously taken in such a system.

It has also been found that it is particularly attractive if the evaluation device is accommodated in a dictation microphone which is arranged to receive dictation and can be connected, as a peripheral device, to the personal computer which constitutes the apparatus of the system and is constructed as a dictation storage device. It is thus achieved that, using the control information additionally generated by a circuit arrangement provided in the personal computer which constitutes the apparatus of the system and is constructed as a dictation storage device, a control operation can be executed in the dictation microphone which constitutes the peripheral device and is constructed to receive dictation, for example, to adjust an amplifier, provided in the dictation microphone and intended for the electric signal supplied by a microphone capsule, to different gain values.

It has been found that it is particularly attractive if the evaluation device accommodated in the dictation microphone constituting the peripheral device controls, in dependence on an evaluated control information item, an indicator device which is provided on the dictation microphone so as to indicate a mode of operation of the personal computer constructed as a dictation storage device. The activation of modes of operation of the personal computer constructed as a dictation storage device can thus be simply indicated on the dictation microphone.

A preferred embodiment of a system in accordance with the invention, in which the circuit arrangement connected to a connection contact comprises a capacitor which is connected to said connection contact, a control device which is arranged to generate and output successive control pulses, and also a switching device which is connected to the capacitor, receives the control pulses from the control device, can be controlled to a given switching state in dependence on said control pulses, and enables, while being in the given switching state and while the counter-connection device of a peripheral device is connected to the connection device, a charging current to flow across a resistor of the connected peripheral device and across the capacitor during a measuring time interval, so that a charging pulse is generated, and also comprises a detection device which is connected to the capacitor and is capable of detecting the time interval between the instant at which the measuring time interval commences and the instant at which, after the beginning of the measuring time interval, a given amplitude value of a charging pulse across the capacitor is reached, it being possible to determine the value of the resistor from said time interval, is characterized in that the control device is additionally arranged to generate and output N additional control pulses which occur between two successive control pulses and are also applied to the switching device, so that N additional charging pulses are generated as control information for the peripheral device, N being larger than or equal to zero, and that a pulse detection device which constitutes at least a part of the evaluation device and is capable of detecting the additional charging pulses is connected to the counter-contact which is connected to the resistor and forms part of the counter-connection device of the peripheral device. It has been found that such a construction is very attractive notably in respect of the implementation utilizing a microcomputer. The additional charging pulses generated may be subjected to encoding in different ways. For example, the number of additional charging pulses between two charging pulses may be encoded in conformity with a code. Furthermore, encoding can also be performed so that a predetermined number of additional charging pulses is provided between every two charging pulses, but that part of the additional charging pulses is not generated for encoding purposes; in the case of encoding no additional charging pulses can then be generated, the number N then being equal to zero.

SUMMARY OF THE INVENTION

In a system in accordance with the invention as described in the foregoing paragraph the pulse detection device can be connected directly to a counter-connection of the counter-connection device of a peripheral device, so that after connection of the counter-connections of the counter-connection device of this peripheral device to the connections of the connection device of an apparatus, the pulse detection device is connected directly to the capacitor of the circuit arrangement in the apparatus. For this case the pulse detection device should have an input which is as high-impedance as possible in order to minimize the influencing of the charging of the capacitor. In this respect it has been found advantageous if the pulse detection device of the evaluation device is connected, via a high-impedance separator stage of the evaluation device, to the counter-contact which is connected to the resistor and forms part of the counter-connection device of the peripheral device. It is thus achieved that no requirements need be imposed as regards the high-impedance state of the input of the pulse detection device, because the insertion of the high-impedance separator stage prevents undesirable influencing of the charging of the capacitor in the circuit arrangement of the apparatus.

It has also been found that it is advantageous if the pulse detection device of the evaluation device also recognizes each charging pulse occurring prior to N additional charging pulses and utilizes such a charging pulse as initial information for the detection of the subsequent N additional charging pulses. This is advantageous with a view to achieving an as simple as possible construction of the pulse detection device and also with a view to achieving an as simple and an as accurate as possible detection of the additional charging pulses.

In this respect it has been found that it is particularly attractive if the control device of the circuit arrangement is arranged to generate a pulse interval prior to each control pulse. A particularly high detection accuracy of the pulse detection device is thus achieved, because additionally the pulse interval prior to each charging pulse is utilize as an additional detection aid.

An apparatus in accordance with the invention is characterized in that at least one circuit arrangement is additionally arranged to generate at least one control information item for a peripheral device which can be connected to the apparatus. A circuit arrangement which is already present in the apparatus in order to determine the value of a resistor is thus additionally used to generate at least one control information item for the peripheral device for the apparatus.

A preferred embodiment of such an apparatus in accordance with the invention is characterized in that the circuit arrangement is provided in a personal computer which constitutes the apparatus of the system and is constructed as a dictation storage device. It has been found that taking the steps in accordance with the invention is particularly attractive for such an apparatus.

A preferred embodiment of an apparatus in accordance with the invention, in which apparatus the circuit arrangement connected to a connection contact comprises a capacitor which is connected to said connection contact, a control device which is arranged to generate and output successive control pulses, and also a switching device which is connected to the capacitor, receives the control pulses from the control device, and can be controlled to a given switching state in dependence on said control pulses, and enables, while being in the given switching state and while the counter-connection device of a peripheral device is connected to the connection device, a charging current to flow across a resistor of the connected peripheral device and across the capacitor during a measuring time interval, so that a charging pulse is generated, the circuit arrangement in said apparatus comprising a detection device which is connected to the capacitor and is capable of detecting the time interval between the instant at which the measuring time interval commences and the instant at which, after the beginning of the measuring time interval, a given amplitude value of a charging pulse across the capacitor is reached, it being possible to determine the value of the resistor from said time interval, is characterized in that the control device is additionally arranged to generate and output N additional control pulses which occur between two successive control pulses and which are also applied to the switching device, so that N additional charging pulses are generated as control information for a peripheral device which can be connected to the apparatus, N being larger than or equal to zero. It has been found that such a construction is very attractive with a view to achieving an as simple as possible implementation of a circuit arrangement for determining the value of a resistor and for additionally generating at least one control information item by means of a microcomputer.

It has also been found that it is particularly advantageous if the control device of the circuit arrangement is arranged to generate a pulse interval prior to each control pulse. A particularly high detection accuracy is thus achieved with the pulse detection device for the detection of the additional charging pulses generated as control information.

A peripheral device in accordance with the invention is characterized in that the peripheral device comprises an evaluation device for evaluating at least one control information item generated by means of a circuit arrangement which forms part of an apparatus which can be detachably connected to the peripheral device, which circuit arrangement is arranged for additionally generating at least one control information item for a peripheral device. It is thus achieved that a control information item generated by an apparatus in accordance with the invention can be evaluated in the peripheral device in accordance with the invention.

It has been found that it is advantageous if the control information item which can be generated by means of a circuit arrangement which is arranged to generate additionally at least one control information item for a peripheral device and forms part of an apparatus detachably connectable to the peripheral device can be derived from a counter-contact which is connected to a resistor of fixed value and forms part of the counter-connection device of the peripheral device, and that the evaluation device of the peripheral device is connected to said counter-contact. It is thus achieved that the amplitude aspects of the control information available in the peripheral device are always the same.

A preferred embodiment of a peripheral device in accordance with the invention is characterized in that the evaluation device is accommodated in a dictation microphone which constitutes the peripheral device and is constructed to receive dictation. It has been found that taking the steps in accordance with the invention is particularly advantageous for such a dictation microphone.

It has also been found that it is particularly advantageous if the evaluation device accommodated in the dictation microphone constituting a peripheral device controls, in dependence on an evaluated control information item, an indicator device which is provided on the dictation microphone so as to indicate a mode of operation of a personal computer constructed as a dictation storage device. The activation of modes of operation of a dictation storage device, or a personal computer constructed as a dictation device, can thus be simply indicated in a dictation microphone constituting a peripheral device.

A peripheral device in accordance with the invention for a system in accordance with the invention, in which system at least one circuit arrangement which is provided in an apparatus of the system so as to determine the value of a resistor comprises a capacitor which is connected to a connection contact of a connection device of the apparatus, a control device which is arranged to generate and output successive control pulses, and also a switching device which is connected to the capacitor, receives the control pulses from the control device, can be controlled to a given switching state in dependence on said control pulses and enables, while being in the given switching state and while the counter-connection device of the peripheral device is connected to the connection device of the apparatus, a charging current to flow across a resistor of the connected peripheral device and across the capacitor during a measuring time interval, so that a charging pulse is generated, and in which system the circuit arrangement provided in the apparatus of the system comprises a detection device which is connected to the capacitor and is capable of detecting the time interval between the instant at which the measuring time interval commences, and the instant at which, after the beginning of the measuring time interval, a given amplitude value of a charging pulse across the capacitor is reached, it being possible to determine the value of the resistor from said time interval, is characterized in that a pulse detection device which constitutes at least a part of the evaluation device is connected to the counter-contact which is connected to the resistor and forms part of the counter-connection device of the peripheral device, which pulse detection device is capable of detecting additional charging pulses which are generated as control information by a circuit arrangement of an apparatus which is detachably connectable to the peripheral device, which circuit arrangement is arranged for additionally generating at least one control information item for the peripheral device. It is thus achieved that the additional charging pulses, generated as control information, can be simply detected in the evaluation device, provided with a pulse detection device, of a peripheral device.

It has been found that it is very advantageous if the pulse detection device of the evaluation device is connected, via a high-impedance separator stage of the evaluation device, to the counter-contact, which is connected to the resistor and forms part of the counter-connection device of the peripheral device. It is thus achieved that the pulse detection device will practically not affect the charging of the capacitor of a circuit arrangement which is provided in an apparatus in accordance with the invention and serves to determine the value of a resistor and to generate additionally at least one control information item.

It has also been found that it is advantageous for a peripheral device if the pulse detection device of the evaluation device also recognizes each charging pulse occurring prior to N additional charging pulses and utilizes such a charging pulse as initial information for the detection of the subsequent N additional charging pulses. This is advantageous with a view to achieving an as simple as possible pulse detection device and also with a view to achieving an as simple and an as reliable as possible detection of the additional charging pulses.

BRIEF DESCRIPTION OF THE DRAWINGS

The invention will be described in detail hereinafter on the basis of two embodiments which are shown in the drawings; however, it is to be understood that the invention is not limited to two embodiments.

DETAILED DESCRIPTION OF THE PREFERRED EMBODIMENTS

Figure 1:
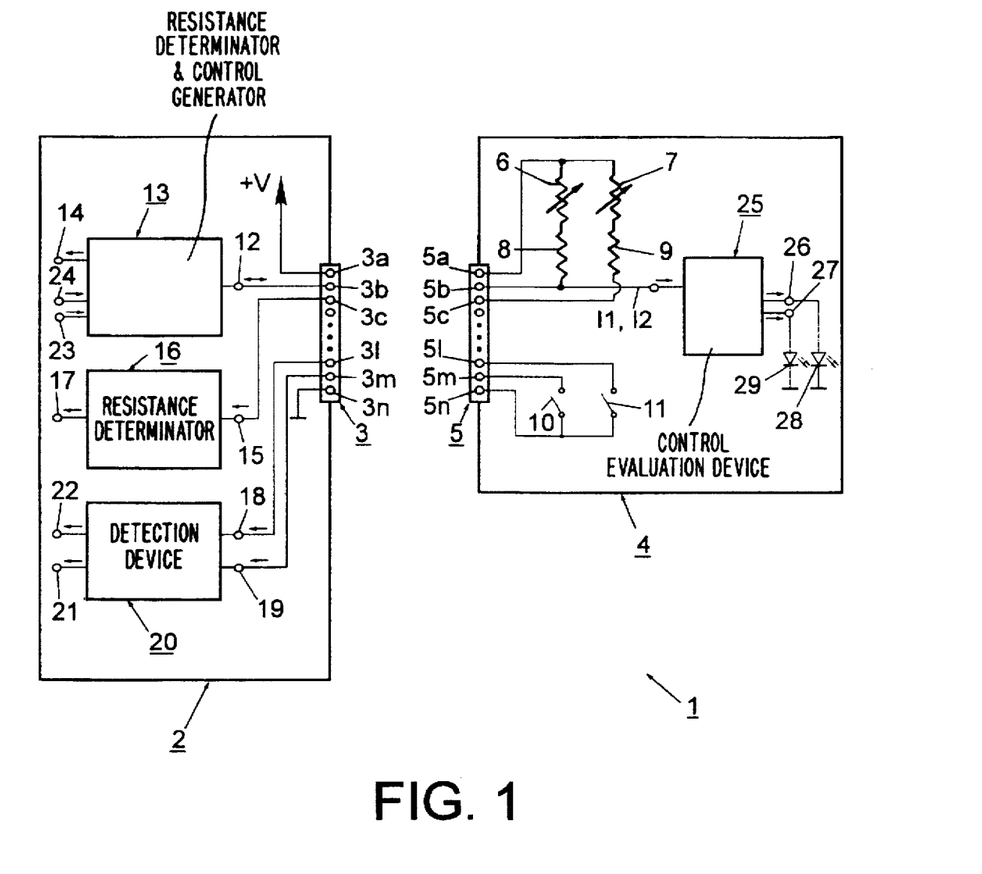
FIG. 1 shows diagrammatically a first embodiment of a system in accordance with the invention, consisting of a first embodiment of an apparatus in accordance with the invention and a first embodiment of a peripheral device in accordance with the invention.

FIG. 1 shows diagrammatically a system 1 which comprises an apparatus in the form of a personal computer 2, including a connection device 3 with connection contacts 3a, 3b, 3c, . . . 3l, 3m, 3n, and also comprises a peripheral device for the personal computer 2 which is formed by a joystick device 4 which can be connected to the personal computer 2 and which comprises a counter-connection device 5 which can be detachably connected to the connection device 3 and comprises counter-contacts 5a, 5b, 5c, . . . 5l, 5m, 5n. For the sake of simplicity the Figure shows only the parts of relevance of the apparatus in the form of a personal computer 2. The personal computer 2 performs a multitude of functions and in the present case is also constructed as a computer game device. The connection device 3 of the personal computer 2 is a so called game port. The joystick device 4 which can be connected to the personal computer 2 comprises a multi-pole connector which constitutes the counter-connection device 5.

The joystick device 4 comprises a joystick (not shown) whereby two variable resistors 6 and 7 of the joystick device 4 can be adjusted. The first variable resistor 6 serves to control the displacement of an object in the x coordinate direction on a display screen (not shown) of the personal computer 2. The second variable resistor 7 enables control of the displacement of an object in the y coordinate direction on the display screen of the personal computer 2. The first variable resistor 6 is connected to the counter-contact 5b via a first, fixed series resistor 8. The second variable resistor 7 is connected to the counter-contact 5c via a second, fixed series resistor 9. The two variable resistors 6 and 7 can be connected to a supply voltage +V via the counter-contact 5a.

The joystick device 4 also comprises two keys (not shown) which are customarily referred to as "fire keys. Via these two keys a respective switch 10, 11 can be actuated so as to trigger a respective fire instruction. The first switch 10 is connected to the counter-contact 5m and the second switch 11 is connected to the counter-contact 5l. The two switches 10 and 11 can be connected to a reference potential, i.e. ground potential, via the counter-contact 5n.

The connection contact 3a of the personal computer 2, detachably connectable to the joystick device 4 via the counter-contact 5a, is connected to a power supply device (not shown) which supplies the connection contact 3a with the supply voltage +V. The connection contact 3n, detachably connectable to the counter-contact 5n, is connected to ground potential.

The connection contact 3b, detachably connectable to the counter-contact 5b, is connected to a connection 12 of a first circuit arrangement 13 provided in the personal computer 2. The first circuit arrangement 13 is arranged to determine the value of a resistor. The actual implementation of the first circuit arrangement 13 is not shown in the embodiment of FIG. 1. The implementation of the first circuit arrangement 13 may be, for example at least essentially the same or similar to that of the embodiment described hereinafter with reference to FIG. 2. The first circuit arrangement 13 comprises an output 14 via which it outputs a resistance information item corresponding to the relevant resistance value determined. In the present case the first circuit arrangement 13 serves to determine the instantaneous adjusted value of the first variable resistor 6 of the joystick device 4.

A connection 15 of a second circuit arrangement 16 for determining the value of a resistor is connected to the connection contact 3c whereto the counter-contact 5c can be detachably connected, which circuit arrangement comprises an output 17 via which it outputs a resistance information item corresponding to the relevant resistance value determined. The second circuit arrangement 16 serves to determine the instantaneous adjusted value of the second variable resistor 7 of the joystick device 4.

The connections 18 and 19 of a detection device 20 are connected to the connection contacts 3l and 3m which are detachably connectable to the counter-contacts 5l and 5m. The detection device 20 is capable of detecting whether the first switch 10 or the second switch 11 of the joystick device 4 is closed. If the detection device 20 determines that the first switch 10 is closed, it outputs a control information item via a first output 21. If the detection device 20 detects that the second switch 11 is closed, it outputs a control information item via a second output 22. The control information output via the outputs 21, 22 is used in the personal computer 2 so as to issue two so-called fire instructions to an object which is displayed on the display screen of the personal computer 2 and can be displaced by means of the variable resistors 6 and 7, for example a gunman of a computer game, the actuation of the first switch 10 and the resultant control information on the first output 21 then triggering a first fire instruction whereas the actuation of the second switch 11 and the resultant control information on the second output 22 trigger a second fire instruction.

When said first fire instruction leads to a strike, a first strike information item is generated in the personal computer 2, said item being applied to a first input 23 of the first circuit arrangement 13. If the fire instruction triggered by the second switch 11 leads to a strike, a second strike information item which is applied to a second control input 24 of the first circuit arrangement 13 is generated in the personal computer 2.

In the present personal computer 2, the first circuit arrangement 13 for determining the value of a resistor provided in the joystick device 4, i.e. of the variable resistor 6, is additionally arranged to generate two control information items for the joystick device 4. The first circuit arrangement 13 is constructed so that the first circuit arrangement 13 generates a first control pulse I1 of predetermined first pulse duration T1 as the first control information item and a second control pulse I2 of a pulse duration T2 which is clearly distinct from the first pulse duration T1 as the second control information item. The control pulses I1 and I2 generated are applied, via the connection 12 which thus constitutes an input as well as an output of the first circuit arrangement 13, to the connection contact 3b and further to the counter-contact 5b of the joystick device 4. It is to be noted that the amplitude of the control pulses I1 and I2 is dependent on the respective adjusted resistance value of the variable resistor 6; however, this is not of importance because the control information contained in each of the two control pulses I1 and I2 is represented by the relevant pulse durations T1 and T2.

The joystick device 4 for which the first circuit arrangement 13 can generate the two control pulses I1 and I2, having the pulse durations T1 and T2, respectively, as control information items comprises an evaluation device 25 for evaluating the control information items generated in the first circuit arrangement 13, i.e. for evaluating the two control pulses I1 and I2 having the pulse durations TI and T2, respectively. The evaluation device 25 is then formed, for example by a pulse duration measuring device implemented by way of a microcomputer and determining the respective pulse durations T1 or T2 of the respective control pulses I1 or I2, respectively, applied thereto. In dependence on the respective pulse duration T1 or T2 determined, the evaluation device 25 connects either a first output 26 or a second output 27 to a high potential, so that either a first LED 28 or a second LED 29 is made to light up.

The first circuit arrangement 13 generates a first control pulse I1 having the pulse duration T1 if its first input 23 receives a strike information item which is generated in the personal computer 2 after actuation of the first switch 10 of the joystick device 4. The first circuit arrangement 13 generates a second control pulse I2, having the pulse duration T2, if its second input 24 receives a strike information item after actuation of the second switch 11. It is thus achieved that when the first switch 10 is actuated and causes a strike, the first LED 28 is made to light up. Analogously, the second LED 29 is made to light up if a strike occurs after actuation of the second switch 11. Instead of the LEDs, there could be provided respective acoustic signal sources, thus enabling acoustic annunciation of a strike.

The first circuit arrangement 13 of the system 1 shown in FIG. 1, therefore, is used not only for determining the respective adjusted value of the variable resistor 6, but also for generating two control information items which are formed as control pulses I1 and I2 of different durations. The control pulses I1 and I2 can be simply detected and evaluated by means of the evaluation device 25 provided in the joystick device 4, so that annunciation or indication of strikes can be particularly simply implemented.

Figure 2:
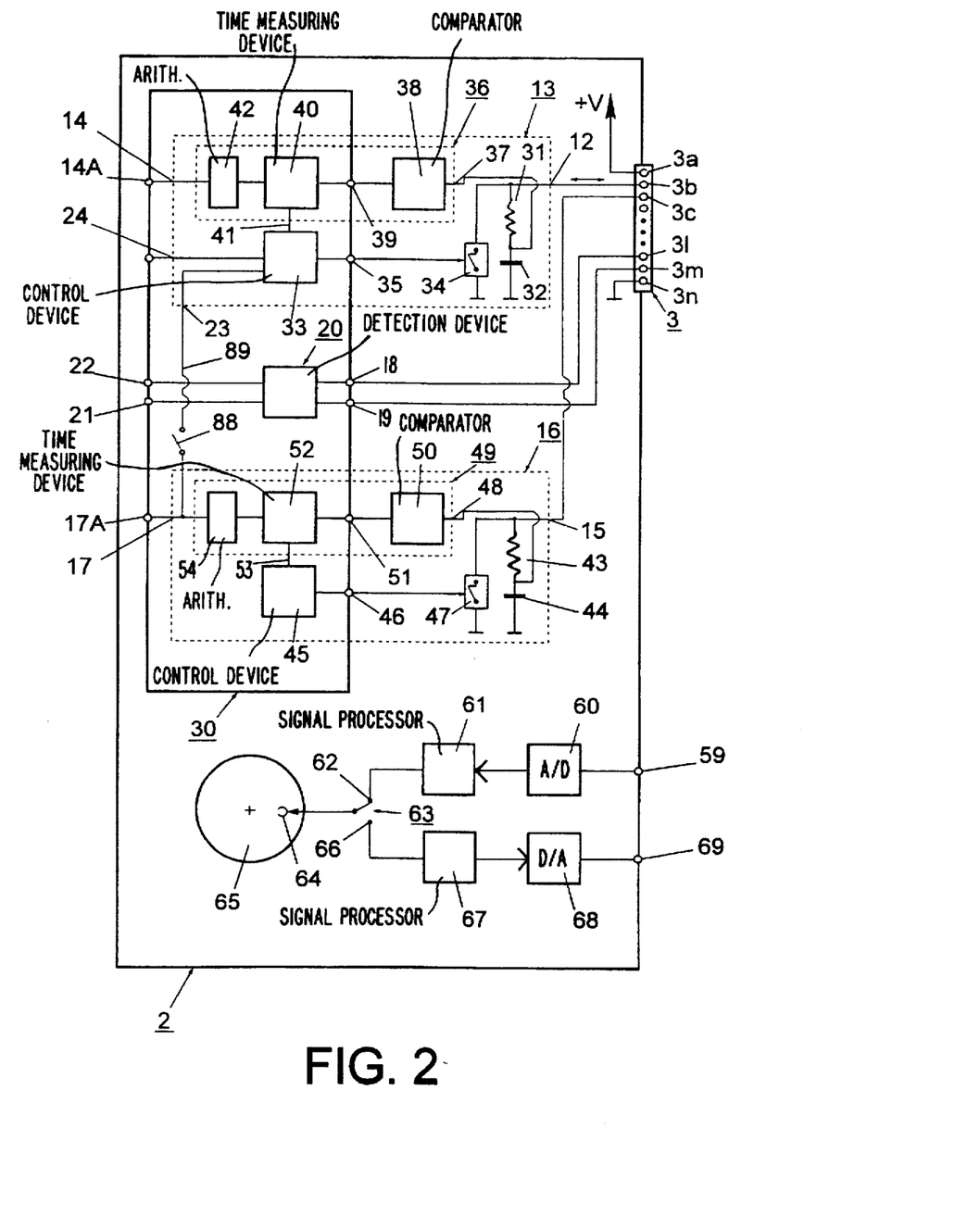
FIG. 2 shows diagrammatically a second embodiment of an apparatus in accordance with the invention of a second embodiment of a system in accordance with the invention.

FIG. 2 shows a second embodiment of an apparatus in accordance with the invention. This apparatus is again formed by a personal computer 2 which carries out a multitude of functions and which is additionally constructed as a dictation storage device in the present case.

Like the personal computer 2 of FIG. 1, the personal computer 2 shown in FIG. 2 comprises a first circuit arrangement 13 which serves to determine the value of a resistor provided in a peripheral device as well as to generate at least one control information item for a peripheral device. The personal computer 2 of FIG. 2 also comprises a second circuit arrangement 16 which is arranged only for determining the value of a resistor provided in a peripheral device. The personal computer 2 of FIG. 2 comprises a detection device 20 in the same way as the personal computer 2 shown in FIG. 1.

The personal computer 2 shown in FIG. 2 comprises a microcomputer 30 implementing part of the first circuit arrangement 13 and part of the second circuit arrangement 16 and the detection device 20.

The first circuit arrangement 13, whose connection 12 is connected to the connection contact 3b, comprises a capacitor 32 which is connected to the connection contact 3b via a fixed series resistor 31. The first circuit arrangement 13 also comprises a control device 33 which is implemented by the microcomputer 30 and which is constructed to generate and output successive control pulses. The first circuit arrangement 13 also comprises a switching device 34 which is connected, via the series resistor 31, to the capacitor 32 and directly to the connection 12 of the circuit arrangement 13. In dependence on these control pulses the switching device 34 receives the control pulses generated by the control device 33, via the connection 35 of the microcomputer 30. The switching device 34 can be controlled to a given switching state, i.e. to its non-conductive switching state in which the electrical connection between ground potential and the connection contact 3b is interrupted. When the counter-connection device 5 of a peripheral device is connected to the connection device 3, in the given switching condition, i.e. in the non-conductive switching condition, the switching device 34 enables, during a measuring time interval corresponding to the pulse duration of a control pulse in the present case, a charging current to flow across a resistor of the connected peripheral device as well as across the series resistor 31 and the capacitor 32, so that a charging pulse is generated. The current in this case concerns a charging current; however, a circuit could also be arranged so that a discharging current flows. The first circuit arrangement 13 also comprises a detection device 36 whose input 37 is connected to the capacitor 32. The detection device 36 comprises a comparator 38 which is connected to its input 37 and which compares the voltage occurring across the capacitor 32 with a given threshold value. A connection 39 of the microcomputer 30 receives from the comparator 38 a control information item whenever the amplitude value of a charging pulse occurring across the capacitor 32 reaches said threshold value. The control information item applied to the microcomputer 30 by the comparator 38, via its connection 39, is applied to a time measuring device 40 implemented by the microcomputer 30. Furthermore, from the control device 33 the time measuring device 40 receives, via a diagrammatically shown connection 41, a control information item which characterizes the beginning of a control pulse and hence the beginning of a measuring time interval. The time measuring device 40 determines the time interval between the instant at which a measuring time interval commences and the instant at which, after the beginning of a measuring time interval, an amplitude value of a charging pulse occurring across the capacitor 32 reaches said threshold value. In conformity with the time interval determined, the time measuring device 40 outputs a time information item to an arithmetic device 42 which is implemented by the microcomputer 30 and calculates, on the basis of the time interval determined and taking into account the presence of the series resistor 31, the value of a resistor which forms part of a peripheral device and is connected to the input 12 of the first circuit arrangement 13. In conformity with the value of a resistor thus determined, the first circuit arrangement 13 outputs a resistance information item via its output 14, which item is made available on an output 14A of the microcomputer 30. This resistance information item can be used in the personal computer 2, for example for controlling the displacement in the x coordinate direction of an object displayed on the display screen of the personal computer 2.

The second circuit arrangement 16 has a construction which is analogous to that of the first circuit arrangement 13. The second circuit arrangement 16 also comprises a series resistor 43, a capacitor 44 and a control device 45 whose control pulses are applied, via a connection 46 of the microcomputer 30, to a switching device 47 which is connected to the capacitor 44 via the series resistor 43 and directly to the connection 15 of the second 25 circuit arrangement 16. The connection 15 is connected to the connection contact 3c of the connection device 3 of the personal computer 2. To the capacitor 44 of the second circuit arrangement 16 there is also connected an input 48 of a detection device 49 which also comprises a comparator 50 and a time measuring device 52 which is connected to the comparator 50 via an connection 51 of the microcomputer 30 and can also receive a control information item concerning the beginning of each control pulse via a diagrammatically shown connection 53. The detection device 49 also comprises an arithmetic device 54 which is connected to the time measuring device 52 and calculates, on the basis of the time interval determined by means of the time measuring device 52 and taking into account the presence of the series resistor 43, the value of a resistor connected to the input 15 of the second circuit arrangement 16. Via its output 17 the second circuit arrangement 16 outputs a resistance information item which corresponds to the resistance value determined and which is available on an output 17A of the microcomputer 30. This resistance information item can be used to control, for example, the displacement in the y coordinate direction of an object displayed on the display screen of the personal computer 2.

Figure 3:
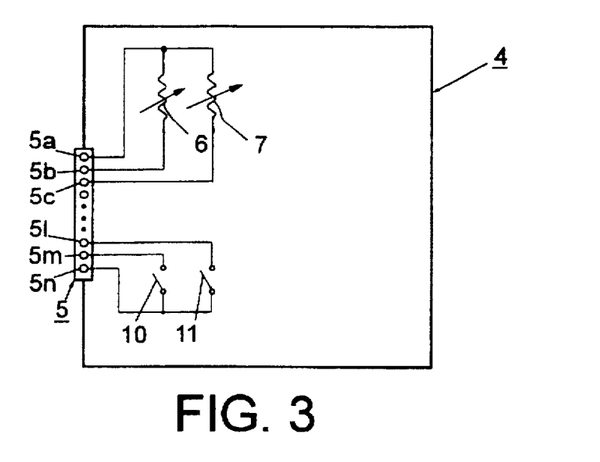
FIG. 3 shows diagrammatically a known peripheral device which can be detachably connected to the apparatus in accordance with the invention shown in FIG. 2.
Figure 4A:
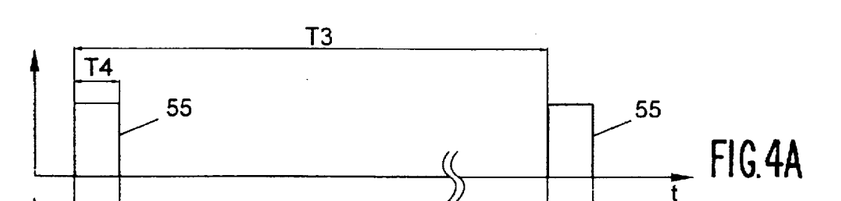
FIG. 4 hows diagrams of waveforms of signals occurring upon cooperation between the apparatus shown in FIG. 2 with the peripheral device shown in FIG. 3.
Figure 4B:
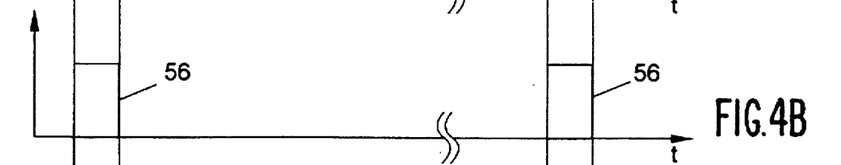
Figure 4C:
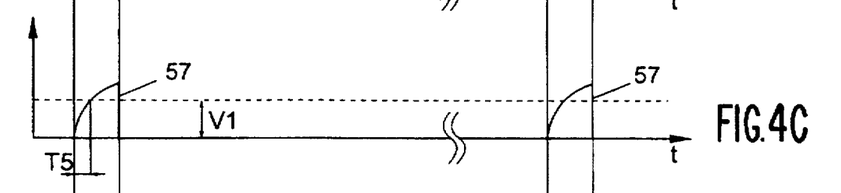
Figure 4D:
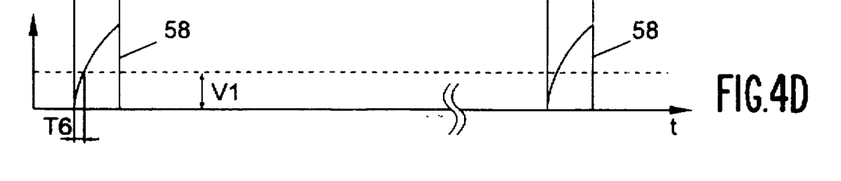

A peripheral device as shown in FIG. 3 can be connected to the personal computer 2 shown in FIG. 2 by inserting the multi-pole connector, serving as the counter-connection device 5, into the game port, acting as the connection device 3, of the personal computer 2. The peripheral device shown in FIG. 3 is constructed as a joystick device 4, like the peripheral device 4 shown in FIG. 1, be it that the conventionally constructed joystick device 4 of FIG. 3 does not comprise an evaluation device for additional control information items generated in the personal computer 2 of FIG. 2. The joystick device 4 of FIG. 3 comprises merely two variable resistors 6 and 7 and two switches 10 and 11 which can be actuated by so-called fire keys.

If the joystick device 4 of FIG. 3 is connected to the personal computer 2 of FIG. 2, the following functional sequence is obtained by execution of a program or program sequence stored in the microcomputer 30.

The control device 33 of the first circuit arrangement 13 successively outputs control pulses 55 of pulse duration T4 at predetermined time intervals T3 as shown in the part A of FIG. 4. The time interval T3 may amount to, for example 100 ms or 200 ms.

The control device 45 of the second circuit arrangement 16 successively outputs control pulses 56 of pulse duration T4 also at the time intervals T3 as denoted in part B of FIG. 4. The control pulses 55 of the control device 33 are applied to the switching device 34 so that the switching device 34 is controlled to its non-conductive state. This enables, a charging current to flow via the variable resistor 6, the series resistor 31 as well as the capacitor 32 during a measuring time interval which corresponds to the pulse duration T4 of a control pulse 55. Thus, upon each control pulse 55 there is generated a charging pulse 57 as shown in part C of FIG. 4. Analogously, the control pulses 56 generated by the control device 45 are applied to the switching device 47, so that the switching device 47 is controlled to its non-conductive state. This enables a charging current to flow via the variable resistor 7, the series resistor 43 as well as the capacitor 44 during a measuring time interval which corresponds to the pulse duration T4 of a control pulse 56. Thus, upon each control pulse 56 there is produced a charging pulse 58 as shown in part D of FIG. 4. Evidently, the rise of the charging pulses 57 and 58 is dependent on the instantaneous values of the variable resistors 6 and 7. The waveforms of the charging pulses 57 and 58 of FIG. 4 reveal that the charging pulses 58 have a leading edge which is steeper than that of the charging pulses 57; this means that the variable resistor 7 is adjusted to a value smaller than that whereto the variable resistor 6 is adjusted. The charging pulses 57 are applied to the comparator 38 and the charging pulses 58 are applied to the comparator 50. In both comparators 38 and 50 a comparison with a threshold value V1 is carried out, as indicated in the parts C and D of FIG. 4. As soon as the amplitude of the charging pulses reaches the threshold value V1, the comparators 38 and 50 apply a control information item to the relevant time measuring device 40, 52. The two time measuring devices 40 and 52, receiving a corresponding control information item via the connections 41 and 53 from the control devices 33 and 45 at the beginning of each control pulse 55 and 56, determine the time intervals T5 and T6 between the instant at which the respective measuring time interval starts and the instant at which the respective amplitude value, corresponding to the threshold value V1, of a charging pulse 57, 58 is reached. The time intervals T5 and T6 are indicated in the parts C and D of FIG. 4. The time measuring devices 40 and 52 subsequently apply time information items corresponding to the time intervals T5 and T6 determined to the arithmetic devices 42 and 54 which calculate the respective adjusted values of the variable resistors 6 and 7 while taking into account the fact that the series resistors 31 and 43 are connected in series with the variable resistors 6 and 7 whose value is to be determined. In conformity with the calculated resistance values, the arithmetic devices 42 and 54 output a corresponding resistance information item on the output 14 of the first circuit arrangement 13 and on the output 17 of the second circuit arrangement 16, respectively. These resistance information items are then available on the outputs 14A and 17A of the microcomputer 30 in order to influence the displacement of an object on the display screen of the personal computer 2.

Also feasible is an embodiment in which each of the two comparators 38 and 50 triggers, when the reaching of the threshold value V1 is detected, the switching back of the relevant switching device 34 or 47 to its conductive state, thus triggering the termination of the measuring time interval, so that the amplitude of the charging pulse is limited essentially to the threshold value V1 and the duration of the charging pulse is variable and dependent on the respective instant of reaching of the threshold value V1 and hence on the respective adjusted resistance value. The duration of these charging pulses corresponds to the measuring time intervals T5 and T6.

The personal computer 2 of FIG. 2, constructed as a dictation storage device, comprises an input 59 which is formed, for example by a socket in which a plug-type connector can be inserted. Analog dictation signals can be applied to the input 59. An analog-to-digital converter 60 which converts the analog dictation signals into digital dictation signals is connected to the input 59. The analog-to-digital converter 60 is succeeded by a signal processing device 61 whereby the processed digital dictation signals are applied to a connection 62 of a switching device 63 whereby the digital dictation signals are applied to a magnetic head 64 for recording the digital dictation signals on a so-called hard disk 65 of the personal computer 2.

Digital dictation signals reproduced from the hard disk of the personal computer 2 by the magnetic head 64 are applied to the switching device 63 and, by appropriate switching of the switching device 63, from a connection 66 thereof to a signal processing device 67. After the processing of the reproduced digital dictation signals by the signal processing device 67, the digital dictation signals are applied to a digital-to-analog converter 68 which outputs reconverted analog dictation signal on an output 69 of the personal computer 2 shown in FIG. 2. For example, the output 69 is also formed as a socket in which a plug-type connector can be inserted.

In the personal computer 2 shown in FIG. 2, the first circuit arrangement 13 for determining the value of a resistor provided in a peripheral device, for example the resistor 6 in the joystick device 4 shown in FIG. 3, is additionally arranged to generate at least one control information item for a peripheral device. To this end, the control device 33 in the first circuit arrangement 13 of the personal computer 2 is also arranged to generate and output N additional control pulses 70 which occur between two successive control pulses 55 as shown in part G of FIG. 6 which will be described in detail hereinafter. The additional control pulses 70 are also applied to the switching device 34, so that N additional charging pulses 71 are generated as control information for a peripheral device as shown in part H of FIG. 6. Depending on what additional control information is to be generated, a different number of additional control pulses 70, and hence additional charging pulses 71, are generated as control information. Such control information may even consist in that no additional charging pulse 71 is generated, in which case the number N equals zero.

Figure 5:
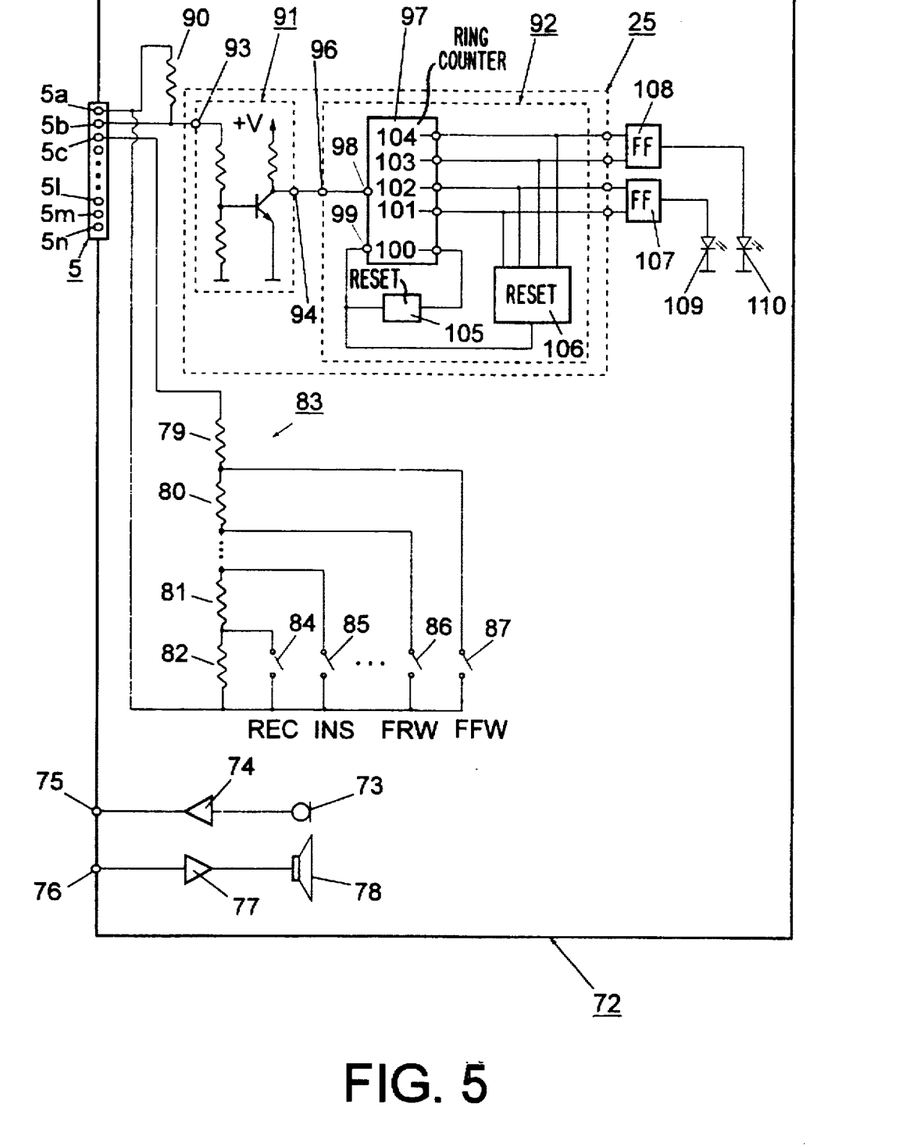
FIG. 5 shows diagrammatically a second embodiment of a peripheral device in accordance with the invention which can be detachably connected to the apparatus in accordance with the invention shown in FIG. 2.
Figures 6A, 6B:
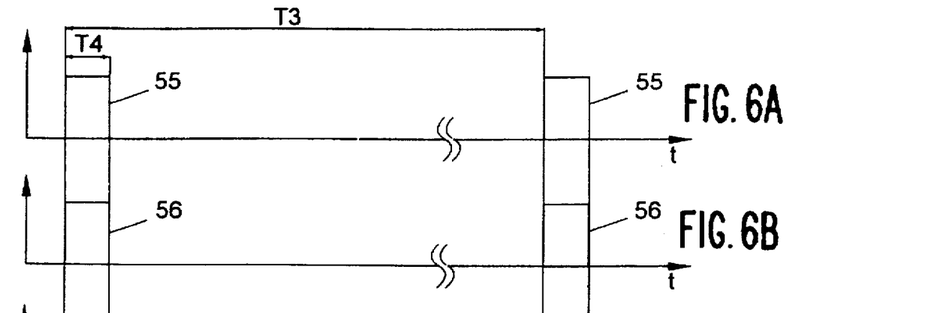
FIG. 6 shows diagrams of waveforms of signals occurring upon cooperation between the apparatus shown in FIG. 2 and the peripheral device shown in FIG. 5.
Figure 6C:
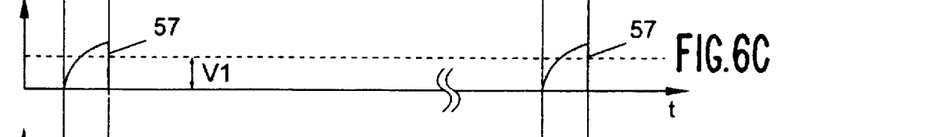
Figure 6D:
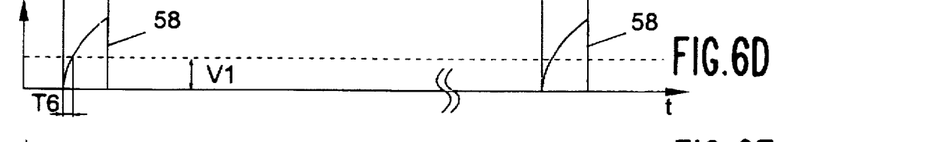
Figure 6E:
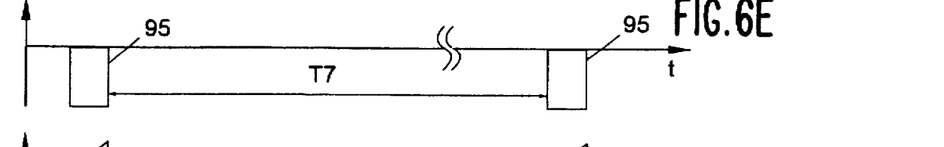
Figure 6F:
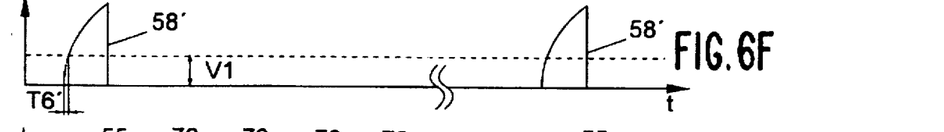
Figures 6G, 6H:
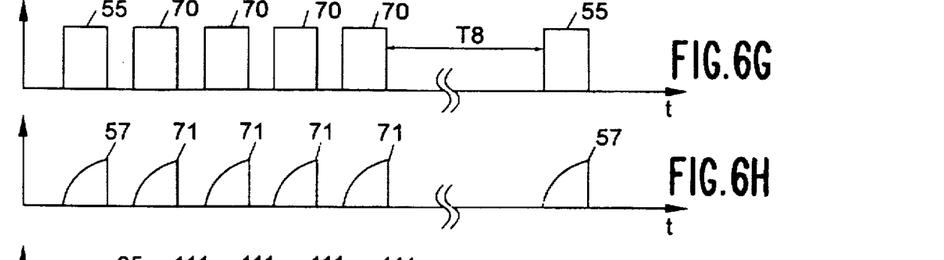
Figure 6I:
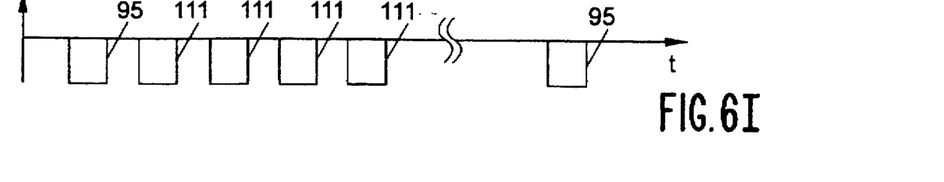

FIG. 5 shows a further peripheral device which is arranged to cooperate with the personal computer 2 which is shown in FIG. 2 and is constructed as a dictation storage device. The peripheral device shown in FIG. 5 is constructed as a dictation microphone 72 which is constructed for the reception and reproduction of dictation. To this end, the dictation microphone 72 shown in FIG. 5 comprises a microphone capsule 73. An amplifier 74 is connected to the microphone capsule 73 in order to amplify the analog dictation signals output thereby, said amplifier itself being connected to an output 75 of the dictation microphone 72. The output 75 is formed, for example by a plug-type connector which can be inserted into the socket-type input 59 of the personal computer 2.

The dictation microphone 72 of FIG. 5 also comprises an input 76 which is formed, for example by a plug-type connector which can be inserted into the socket-type output 69 of the personal computer 2. The reconverted analog dictation signals applied to the input 76 of the dictation microphone 72 are applied from the input 76 to an amplifier 77 and further to a loudspeaker 78 for acoustic reproduction.

The peripheral device constructed as a dictation microphone 72 as shown in FIG. 5 is provided with a resistor chain 83 consisting of a plurality of resistors 79, 80, 81 and 82. The resistor chain 83 is connected between the two counter-contacts 5a and 5c of the counter-connection device 5. The resistor 82 can be bridged by means of a switch 84. The series connection formed by the two resistors 81 and 82 can be bridged by means of a switch 85. The series connection formed by the two resistors 81 and 82 as well as further resistors (not shown) can be bridged by means of a switch 86. The series connection of the resistors 81 and 82 and the further resistors (not shown) and the resistor 80 can be bridged by means of a switch 87.

The personal computer 2 of FIG. 2, constructed as a dictation storage device, can be switched to a so-called "recording" mode by actuation of the switch 84. The personal computer 2 of FIG. 2, constructed as a dictation storage device, can be switched to a so-called "insert" mode by actuation of the switch 85; in this mode a dictation insert can be inserted into an existing recorded dictation. The personal computer 2 of FIG. 2, constructed as a dictation storage device, can be switched to a so-called "fast rewind" mode by actuation of the switch 86. The personal computer 2 of FIG. 2, constructed as a dictation storage device, can be switched to a so-called "fast forward" mode by actuation of the switch 87. When none of the switches 84, 85, 86 or 87 is actuated, the personal computer 2 of FIG. 2, constructed as a dictation storage device, is in a so-called "stop" mode.

The respective resistance value of the resistor chain 83 can be determined by means of the second circuit arrangement 16 whose connection 15 is connected to the resistor chain 83 via the connection contact 3c and the counter-contact 5c. To this end, the control device 45 of the second circuit arrangement 16 outputs control pulses 56 as shown in part B of FIG. 6. The control pulses 56 are applied to the switching device 47 so that charging pulses 58 are generated as shown in part D of FIG. 6. The charging pulses 58 are applied to the comparator 50 in which the amplitude of the charging pulses 58 is compared with a threshold value V1. When the amplitude of the charging pulses reaches the threshold value V1, the comparator 50 applies a control information item to the time measuring device 52. The time measuring device 52, also receiving information concerning the beginning of a control pulse 56 and hence concerning the beginning of a measuring time interval via the connection 53, subsequently determines the time interval T6 as indicated in part D of FIG. 6. In response thereto, the time measuring device 52 applies a time information item corresponding to the time interval determined to the arithmetic device 54 which determines the resistance value of the resistor chain 83 in response thereto.

Part D of FIG. 6 shows charging pulses 58 which are generated if none of the resistors 79, 80, 81 and 82 is bridged by one of the switches 84, 85, 86 and 87, i.e. if the entire resistor chain 83 is operative, meaning that the dictation storage device formed by the personal computer 2 is in the "stop" mode. The arithmetic device 54 then applies a resistance information item, corresponding to the resistance value of the entire resistor chain 83 and characterizing the "top" mode, to the output 17 of the second circuit arrangement 16. This resistance information can be derived from the output 17A of the microcomputer 30 for various control purposes in the personal computer 2.

When the dictation microphone 72 shown in FIG. 5 is connected to the personal computer 2, the resistance information available on the output 17 of the second circuit arrangement 16 is also applied, via a control connection 89 which can be activated in this case as symbolically denoted by a switch 88, to the control input 23 of the first circuit arrangement 13 and further to the control device 33. The function of the control device 33 can thus be influenced by the resistance information supplied by the arithmetic device 54. If the arithmetic device 54 applies the resistance information corresponding to the resistance value of the entire resistor chain 83 to the control device 33 via the control connection 89, the function of the control device 33 will not be affected. Consequently, the control device 33 outputs successively control pulses 55, as shown in part A of FIG. 6, in exactly the same way as the control device 45.

In the dictation microphone 72 shown in FIG. 5 a resistor 90 of fixed value is connected to the counter-contact 5b, the other end of said resistor being connected to the counter-contact 5a. Because of the control pulses 55 applied to the switching device 34 by the control device 33 and because of the resultant switching of the switching device 34 to its non-conductive state, a charging current is enabled to flow across the resistor 90 as well as across the series resistor 31 and the capacitor 32 during a measuring time interval corresponding to the pulse duration T4 of a control pulse 55, with the result that charging pulses 57 are generated which always vary in the same way because of the fixed resistance value of the resistor 90. The charging pulses 57 are applied to the comparator 38 which, when the amplitude of the charging pulses 57 reaches the threshold value V1, outputs a control information item to the time measuring device 40 which, however, if the dictation microphone 72 is connected to the personal computer 2, is programmed in such a manner that it does not determine a time interval T5, so that the downstream arithmetic device 42 does not calculate a resistance value for the resistor 90 of fixed value, because that is not required or does not make sense.

In the dictation microphone 72 shown in FIG. 5 an evaluation device 25 is connected to the counter-contact 5b, which evaluation device comprises a high-impedance separator stage 91 and a pulse detection device 92. The separator stage 91 is constructed as a simple transistor stage. The separator stage 91 prevents adverse influencing of the charging of the capacitor 32 by the pulse detection device 92. The separator stage 91 receives the charging pulses 57 on its input 93. In response thereto, the output 94 of the separator stage 91 outputs counting pulses 95 as shown in part E of FIG. 6. The counting pulses 95, corresponding to the charging pulses 57, are applied to an input 96 of the pulse detection device 92. The pulse detection device 92 comprises a ring counter 97 which comprises a clock input 98 and a reset input 99. An output 100, an output 101, an output 102, an output 103 and an output 104 of the ring counter 97 are shown. The output 100 of the ring counter 97 outputs a counting signal if the clock input 98 has received only a single counting pulse. The ring counter 97 outputs a counting signal via its output 101 if the clock input 98 has received a total of five counting pulses. The ring counter 97 outputs a counting signal via its output 102 if its clock input 98 has received a total of six counting pulses. The ring counter 97 outputs a counting signal via its output 103 if its clock input 98 has received a total of seven counting pulses. The ring counter 97 outputs a counting signal via its output 104 if its clock input 98 has received a total of eight counting pulses.

To the output 100 there is connected a reset stage 105 which generates a reset signal if the clock input 98 of the ring counter 97 has received only a single counting pulse, the ring counter 97 then outputting the same counting signal via its output 100 for a prolonged period of time, which reset signal is applied to the reset input 99 of the ring counter 97 so that the ring counter 97 is set to zero. Analogously, a further reset stage 106 is connected to the outputs 101, 102, 103 and 104; if the ring counter outputs a counting signal via one of its outputs 101, 102, 103 or 104 for more than a predetermined period of time, a reset signal is then generated and applied to the reset input 99 of the ring counter 97, so that the ring counter 97 is set to zero.

In order to store the counting signals output via the outputs 101 or 102 and 103 or 104, two storage devices which are formed by flip-flops 107 and 108 are connected to these outputs of the ring counter 97. A LED 109 is connected to the flip-flop 107 and a LED 110 is connected to the flipflop 108.

As has already been stated, in the case where a resistance value corresponding to the total resistor chain 82 is determined by means of the second circuit arrangement 16, the arithmetic device 54 applies a resistance information item, via the connection 89, to the control device 33 of the first circuit arrangement 13, which item does not modify the function of the control device 33, so that the control device 33 outputs the control pulses 55 shown in part A of FIG. 6. These control pulses 55 produce the charging pulses 57 as shown in part C of FIG. 6. Because of the presence of the series resistor 31, pulses which are proportional to the charging pulses 57 in respect of amplitude are applied to the separator stage 91. As a result, counting pulses 95 in conformity with part E of FIG. 6 appear on the output 94 of the separator stage 91. A time interval T7 elapses between two counting pulses 95. When the counting pulses 95 are applied to the clock input 98 of the ring counter 97, such a counting pulse 95 triggers the appearance of a counting signal on the output 100 of the ring counter 97. However, because no further counting pulse occurs within the time interval T7 after such a counting pulse, the reset stage 105 generates a reset signal whereby the ring counter 97 is reset to zero.

If subsequently the switch 84 is closed, for example by actuation of a key provided on the dictation microphone 72 shown in FIG. 5, i.e. when the user of the dictation microphone 72 activates the "recording" mode in the dictation storage device formed by the personal computer 2 of FIG. 2, the resistor 82 of the resistor chain 83 is bridged so that the resistance of the resistor chain 83 changes. Due to this change of the resistance of the resistor chain 83, other charging pulses 58' as shown in part F of FIG. 6 will be generated when the control device 45 outputs a control pulse 56 and the switching state of the switching device 47 changes. Due to these modified charging pulses 58', the arithmetic device 54 of the second circuit arrangement 16 determines a modified resistance value of the resistor chain 83. Consequently, the arithmetic device 54 outputs, via the activated connection 89, a resistance information item to the control device 33 of the first circuit arrangement 13, thus changing the function of the control device 33.

Such changing of the function of the control device 33 consists in that, after the generating and the appearance of the control pulse 55 produced after reception of the previously stated resistance information item, the control device 33 once generates additional control pulses 70 in addition to said control pulse 55 as is shown in part G of FIG. 6. For example, the control device 33 generates four additional control pulses 70 when the switch 84 is actuated so that the resistance of the resistor chain 83 is changed. On the basis of the additional control pulses 70 generated by the control device 33, additional charging pulses 71 are generated in addition to the charging pulses 57 as is shown in part H of FIG. 6. Pulses which are proportional to these additional charging pulses 71 in respect of amplitude are also applied to the separator stage 91, so that on the output 94 of the separator stage 91 there are generated additional counting pulses 111 as shown in part K of FIG. 6. These additional counting pulses 111, corresponding to the additional charging pulses 71, are applied, together with the counting pulses 95, to the clock input 98 of the ring counter 97.

The control device 33 of the first circuit arrangement 13 is preferably constructed in such a manner that it generates, prior to each control pulse 95, a pulse interval having a minimum duration T8 as indicated in part G of FIG. 6. This is advantageous with a view to achieving an as simple and an as reliable detection as possible of counting pulses by means of the pulse detection device 92 which is formed essentially by a ring counter 97.

In the above case where it is assumed that the switch 84 is closed by the user of the dictation microphone 72 so that the control device 33 generates four additional control pulses 70 after a control pulse 55, all said control pulses together ultimately produce the counting pulse sequence shown in part K of FIG. 6, consisting of one counting pulse 95 and four additional counting pulses 111.

When this counting pulse sequence is applied to the clock input 98 of the ring counter 97, the ring counter 97 first recognizes the counting pulse 95 as initial information and subsequently recognizes the four further additional counting pulses 111 as control information; consequently, the ring counter 97 outputs a counting signal via its output 101. This counting signal is applied to she flip-flop 107 in which the corresponding signal state is stored, so that the LED 109 is made to light up. After the appearance of the last additional counting pulse 111 of the counting pulse sequence, the time interval T8 elapses during which no further counting pulse occurs. Consequently, via the reset stage 106 a reset signal is generated whereby the ring counter 97 is reset to zero again. However, the state of the flip-flop 107 then remains the same, so that the LED 109 continues to be lit up. The next counting pulse 95 is again recognized as initial information for the next counting cycle in which, however, no further additional counting pulses 111 occur as control information, so that the ring counter 97 is again reset to zero via the reset stage 106; this does not have any effect. This procedure is terminated only if another counting pulse sequence, comprising a different number of additional counting pulses 111, is applied to the ring counter 97.

If the switch 84 is opened again after having been closed, the resistance value of the entire resistor chain 83 will be effective again; this is detected by means of the second circuit arrangement 16 which outputs a corresponding resistance information item to the control device 33 of the first circuit arrangement 13. Because the switch 84 was previously closed, this resistance information causes the control device 33 to generate five additional control pulses 70 as control information. This, ultimately causes the ring counter 97 to output, via its output 102, a counting signal which is applied to the flip-flop 107, so that the flip-flop 107 is switched over and the LED 109 extinguishes.

A completely analog procedure can be triggered by actuation of the switch 85, the LED 110 then being made to light up with a closed switch 85, i.e. in the activated "insert" mode, the LED 110 is extinguishes again when the switch 85 is subsequently opened.

Instead of generating a predetermined number of additional control pulses only once as control information after a control pulse, they can also be generated after a plurality of control pulses or after each control pulse.

As will be evident from the foregoing description of the personal computer 2 of FIG. 2, constructed as a dictation storage device or a dictation device, and of the joystick device 4 of FIG. 3 and the dictation microphone 72 of FIG. 5, it is particularly simply achieved that the first circuit arrangement 13 provided in the personal computer 2 is suitable not only for determining the value of the resistor 6 in the joystick device 4 which is shown in FIG. 3 and can be connected to the personal computer 2 of FIG. 2, but also for generating control information for the dictation microphone 72 which is shown in FIG. 5 and can also be connected to the personal computer 2 of FIG. 2. This does not require any substantial modification of or addition to the personal computer 2 of FIG. 2, but only a slight expenditure for achieving the different modes of operation of the control device 33, implemented by the microcomputer 30, of the first circuit arrangement 13.

The personal computer 2 shown in FIG. 2 is constructed both as a computer game device and as a dictation storage device. However, the computer game device in such a personal computer 2 can also be dispensed with; in that case, however, such a personal computer 2 is conceived only to cooperate with a dictation microphone 72 as shown in FIG. 5.

What is claimed is:

1. A system comprising:
  an apparatus having a plurality of apparatus contacts, and
  a peripheral device having a plurality of peripheral contacts for communicating between the peripheral device and the apparatus via the apparatus contacts, each peripheral contact having an associated apparatus contact;
  wherein,
    a first peripheral contact is connected to a resistor provided in the peripheral device,
    a first apparatus contact associated with said first peripheral contact is connected to a first circuit arrangement which is provided in the apparatus for determining a resistance value in dependence upon said resistor in the peripheral device,
    a second circuit arrangement is further provided in the apparatus to generate at least one control information item for the peripheral device, said control information item being generated in dependence upon a communication from said peripheral device to said apparatus, and
    an evaluation unit is further provided in the peripheral device to evaluate said control information item.

2. A system as claimed in claim 1, wherein:
  the control information item is communicated to the peripheral device via said first apparatus contact and first peripheral contact.

3. A system as claimed in claim 1, wherein said apparatus is a computer constructed as a dictation storage device.

4. A system as claimed in claim 3, wherein said peripheral device further comprises a microphone for communicating dictation signals to said dictation storage device.

5. A system as claimed in claim 4, wherein:
  said dictation storage device is operated in one of several modes,
  said control information item communicates said mode of operation to the evaluation unit in the peripheral device, and said evaluation unit provides a mode indicator in the peripheral device, indicative of said mode of operation of the dictation storage device.

6. A system as claimed in claim 1, wherein
said first circuit arrangement in the apparatus for determining the resistance value comprises a capacitor, and a means for charging the capacitor via charging pulses,
said resistance value is determined by measuring a time duration for the capacitor to reach a given amplitude value, and
said evaluation unit in the peripheral device comprises means for detecting said charging pulses, and said evaluation of the control information item is effected in dependence upon the said detection of the charging pulses.

7. A system as claimed in claim 6, wherein the means for detecting the charging pulses is connected to the first peripheral contact, via a high impedance separator stage.

8. A system as claimed in claim 6, wherein the evaluation of the control information item is effected by evaluating a series of consecutive charging pulses.

9. A system as claimed in claim 6, wherein the charging pulses are delineated by a specified pulse interval prior to each charging pulse.

10. An apparatus for use in a system comprising said apparatus and a peripheral device, the peripheral device having a resistor and a plurality of peripheral contacts, wherein:

the apparatus comprises:
a plurality of apparatus contacts for communicating between the device and the peripheral device via the peripheral contacts,
a first circuit arrangement for determining a resistance value,
a first apparatus contact connected to said first circuit arrangement, so that said determination of resistance value is effected in dependence upon the resistor in the peripheral device,
a second circuit arrangement to generate at least one control information item for communication to the peripheral device, said control information item being generated in dependence upon a communication from the peripheral device to the apparatus.

11. An apparatus as claimed in claim 10, characterized in that the apparatus is a computer device constructed as a dictation storage device.

12. An apparatus as claimed in claim 10, wherein:
said first circuit arrangement in the apparatus for determining the resistance value comprises a capacitor, and a means for charging the capacitor via charging pulses, and
said resistance value is determined by measuring a time duration for the capacitor to reach a given amplitude value.

13. An apparatus as claimed in claim 12, wherein the charging pulses are delineated by a specified pulse interval prior to each charging pulse.

14. A peripheral device for use in a system comprising said peripheral device and an apparatus, said apparatus comprising means for communicating to and from said peripheral device, means for measuring a resistance value, and means for generating a control information item in dependence upon the communications from said peripheral device, wherein the peripheral device comprises:
a resistor whose resistance value is measured by said apparatus,
an evaluation unit which evaluates the control information item to form a result, and
an indicator which indicates said result.

15. A peripheral device as claimed in claim 14, wherein said resistor and said evaluation unit are connected to a common contact for communication with the apparatus.

16. A peripheral device as claimed in claim 14, said peripheral device further comprises a microphone for communicating dictation signals to the apparatus.

17. A peripheral device as claimed in claim 16, wherein said control information item communicates a mode of operation of the apparatus, and said indicated result is said mode of operation.

18. A peripheral device as claimed in claim 16, wherein said control information item comprises successive control pulses, and said evaluation unit comprises means for evaluating the successive control pulses.

19. A peripheral device as claimed in claim 18, wherein the means for evaluating the successive control pulses is connected to the resistor, via a high impedance separator stage.

20. A system as claimed in claim 18, wherein the evaluation of the control information item is effected by evaluating a multiple number of successive control pulses.

* * * * *